July 24, 1928.
W. LEWIS
1,678,400
SPRING CUSHION
Filed April 2, 1926
3 Sheets-Sheet 2
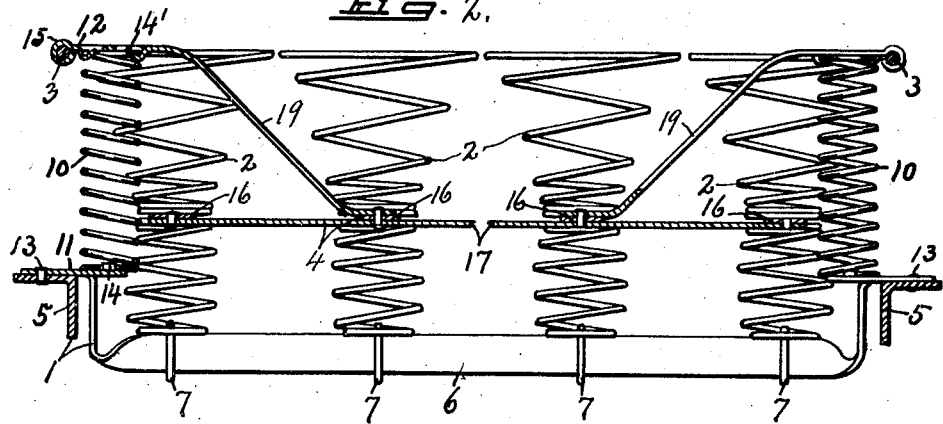
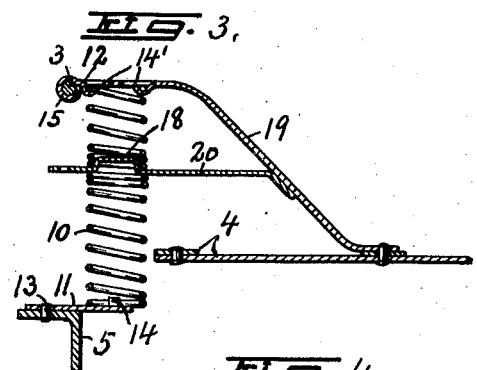
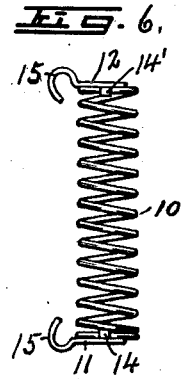
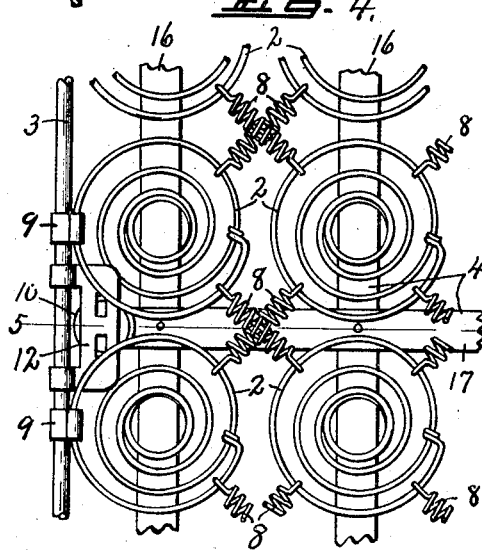
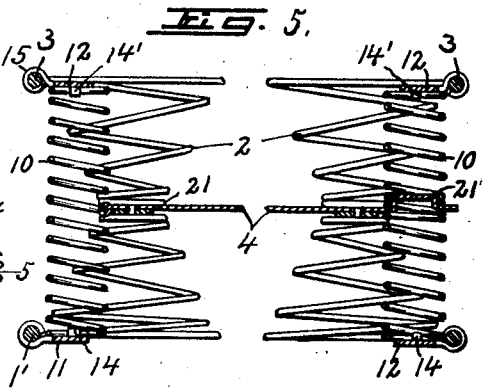
WITNESS
INVENTOR
Wm Lewis
BY
ATTORNEYS July 24, 1928.
W. LEWIS
1,678,400
SPRING CUSHION
Filed April 2, 1926  3 Sheets-Sheet 3
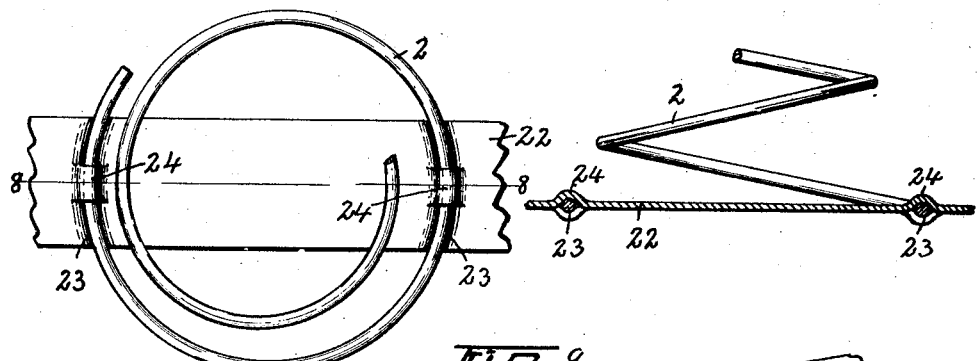
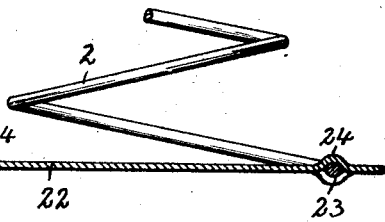
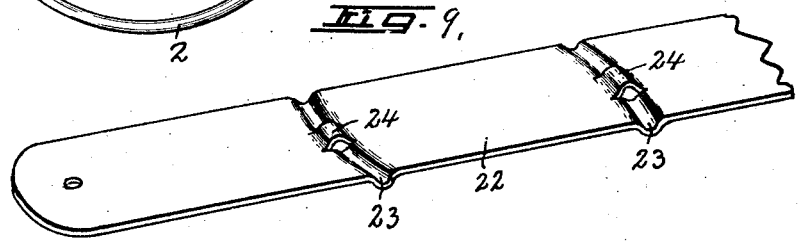
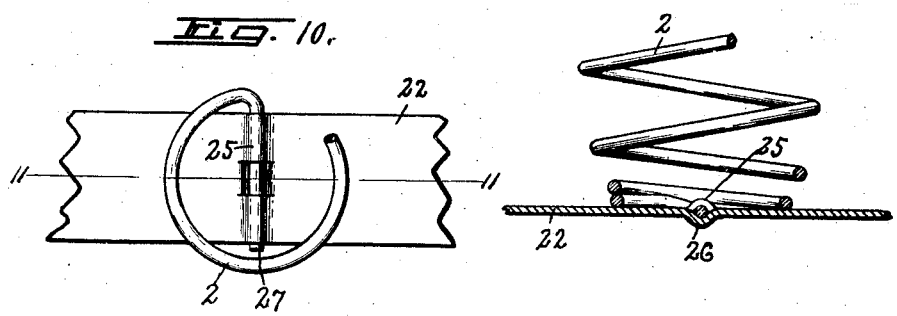
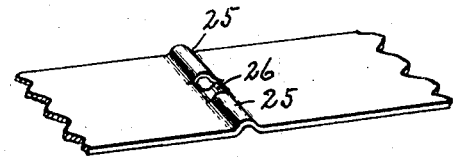
INVENTOR
Wm Lewis
BY
ATTORNEYS
WITNESS Patented July 24, 1928.

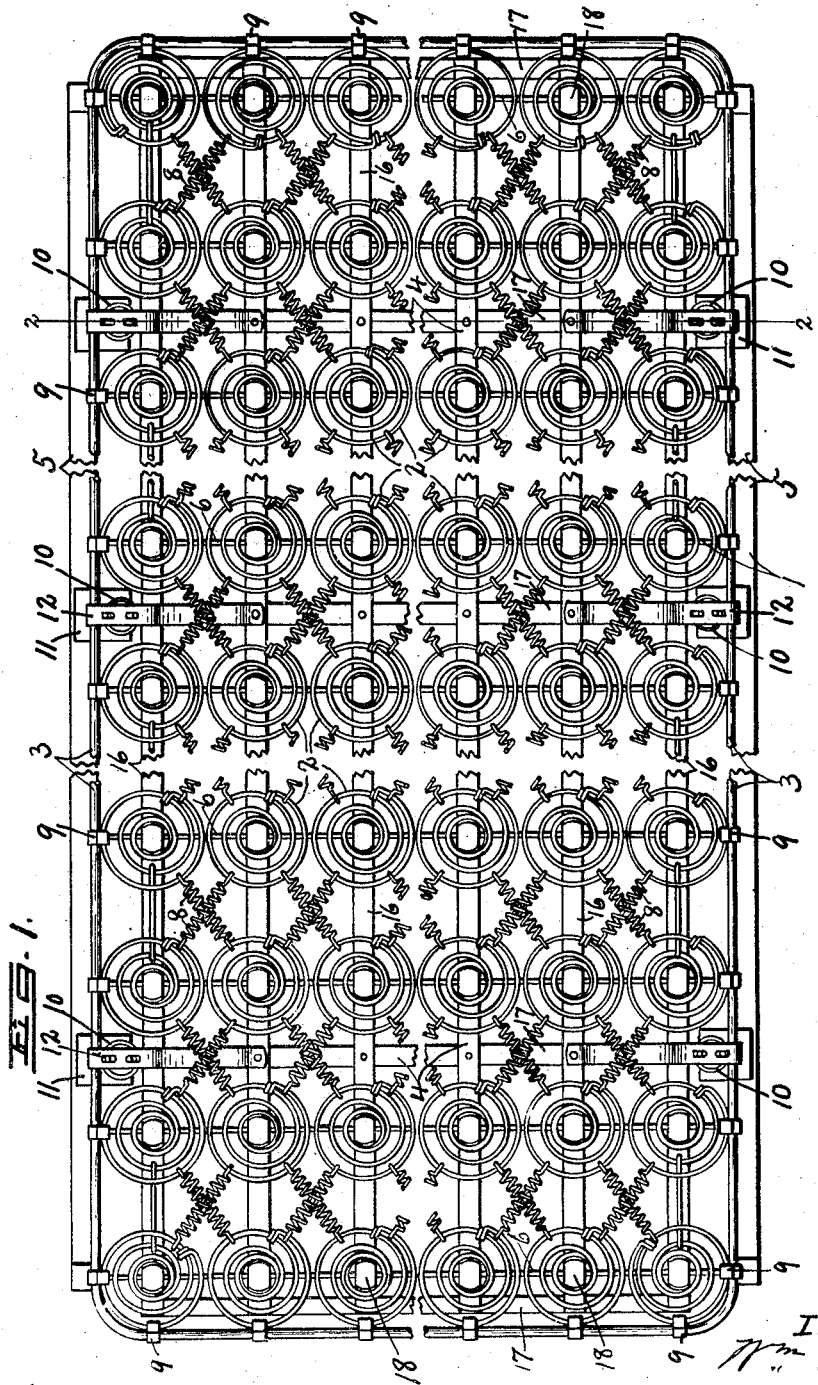

1,678,400

UNITED STATES PATENT OFFICE.

WILLIAM LEWIS, OF UTICA, NEW YORK.

SPRING CUSHION.

Application filed April 2, 1926. Serial No. 99,261.

This invention relates to certain improvements in spring cushions such as spring beds but is equally useful in various kinds of upholstered furniture including the seats and backs of automobiles and other vehicles in which coiled springs are commonly used.

In cushions of this character the coiled springs are usually arranged systematically in longitudinal and transverse rows and in spaced relation to each other to avoid clashing or friction between adjacent springs which are usually attached at one end to a suitable support and have their opposite ends systematically connected to each other, usually by flexible connections, for holding them in the desired spaced relation and also permitting more or less independent action of the independent springs.

In most instances, it is desired to support these springs with their axes parallel and their outer ends disposed in approximately the same plane for receiving and supporting a mattress or suitable upholstering.

It is well-known that the outer longitudinal edges of spring beds or cushions of this type are subjected to greater pressures and strains in all directions than the intermediate portions by reason of the more frequent use of those parts which tends to flatten or otherwise deform them and also tends to deflect the outer ends of the springs laterally in one direction or the other according to the extent of use.

The main object of the present invention is to provide means for reducing to a minimum this tendency to deformation and lateral thrust or weave of the outer ends of the springs and at the same time to preserve the full resiliency of the springs axially by introducing supplemental coiled springs at intervals along the marginal edges of the main supporting frame and bracing the outer ends of the main springs against lateral thrust.

Other objects and uses relating to specific parts of the cushion will be brought out in the following description.

In the drawings:

Figure 1 is a top plan of a spring bed mattress, partly broken away longitudinally and transversely, but showing the essential features of my invention as used more particularly for iron bedsteads.

Figure 2 is an enlarged transverse vertical sectional view, partly broken away taken on line 2—2, Figure 1.

Figure 3 is a vertical sectional view through one side of the cushion similar to that shown in Figure 2 except that the brace is provided with an additional bracing member engaging the intermediate portion of one of the supplemental springs.

Figure 4 is a top plan of a fragmentary portion of a mattress or cushion for wood beds adapted to be supported upon cross slats.

Figure 5 is a vertical sectional view taken in the plane of line 5—5, Figure 4.

Figure 6 is a side elevation of one of the detached supplemental springs shown in Figure 5.

Figure 7 is an end view of a portion of one of the main coiled springs and adjacent portion of its supporting bar showing the means for attaching the spring to said bar.

Figure 8 is a sectional view taken on line 8—8, Figure 7.

Figure 9 is a perspective view of a portion of the spring supporting plate shown in Figures 7 and 8.

Figure 10 is an end view of a portion of a coiled spring and adjacent portion of its supporting bar showing a modified means for connecting said spring to the bar.

Figure 11 is a sectional view taken in the plane of line 11—11, Figure 10.

Figure 12 is a perspective view of a portion of the spring-supporting bar shown in Figures 10 and 11.

The spring cushion construction shown in Figures 1 and 2 comprises a main supporting frame or lower deck —1—, a system of main coiled springs —2— mounted upon the main supporting frame to extend in the same direction therefrom, a marginal rail or upper deck —3— extending along the marginal edges of the frame —1— and supported upon the upper ends of the outer marginal springs —2— in spaced relation to the main frame —1— and an intermediate deck or floating frame —4— operatively connected to and carried by the intermediate portions of the springs —2— in spaced relation to the frame —1— and rail —3— thus permitting resilient movement of the rail and intermediate frame relatively to the main supporting frame.

The main frame —1— comprises opposite lengthwise side bars —5— preferably of angle iron, cross bars —6— connecting the side bars at right angles thereto and parallel lengthwise tie rods —7— connecting the cross bars —6—.

The cross bars —6— are arranged in uniformly spaced relation lengthwise of the frame —1— and are riveted or otherwise secured at their ends to the lengthwise bars —5—, Figure 2, the central portion of said cross bars being depressed to a horizontal plane below the upper faces of the side bars —5— and are preferably arranged edgewise vertically for reinforcing purposes for receiving and supporting the lower ends of the springs —2— which are arranged in rows and in uniformly spaced relation directly over their respective cross bars —6—.

The tie rods —7— which extend longitudinally across the undersides of the cross bars —6— are provided with loops at the crossings for receiving and bracing the cross bars against relatively longitudinal movement, the portions of the tie rods adjacent the cross bars being interlocked with the adjacent helices of the springs —2— for holding the lower ends of said springs in fixed relation to the cross bars and also in spaced relation to each other.

One of the objects in depressing the intermediate portions of the cross bars —6— below the upper faces of the side bars —5— is to permit the use of relatively long coiled springs —2— for greater resiliency and range of action.

The coiled springs —2— are preferably tapered and of uniform axial length, the smaller ends being secured to their respective cross bars —6— by means of the tie rods —7— so that the upper or larger ends will be disposed in substantially the same horizontal plane some distance above and parallel with the frame —1—.

The entire system of springs —2— are symmetrically arranged in parallel lengthwise rows following the tie rods —7— and are also arranged in parallel transverse rows following the cross bars —6—, the upper ends of adjacent diagonally opposite springs being flexibly connected to each other by relatively small coil springs —8—, Figure 1, to permit the main springs to yield relatively to each other under pressure and also to restore said springs to their normal positions.

The rail —3— extends entirely around the upper ends of the marginal series of the springs —2— and is secured to the outer portions of the upper convolutions of the adjacent springs by clips —9— thereby holding the upper ends of said marginal series of springs in fixed spaced relation and serving to distribute any load or pressure applied thereto along the several marginal springs and also serving to normally hold the upper ends of said springs in substantially the same horizontal plane.

It is also evident that any lateral pressure which may be applied to any part of the rail will be transmitted to the upper ends of adjacent springs and, by reason of their securement to the main frame —1—, aids to some extent in resisting the lateral thrust or deflection of the upper ends of the entire system of springs under lateral pressures in one direction.

It is found, however, that while the securement of the marginal rail 3 to the outer portions of the upper helices of the springs —2— is of great advantage in maintaining the ends of said springs at approximately the same level and also in partially resisting the lateral thrust of the upper portions of the springs under lateral pressure the resistance of the outer portion of the upper helices to pressure upon the rail is comparatively light or insufficient to bear heavy loads particularly upon the intermediate portions of opposite sides of the rail which are subjected to the most severe strains and consequent flattening of the adjacent portions of the spring mattress.

Suitable means is therefore provided to compensate for this weakness, said means consisting in this instance in providing relatively small supplemental coiled springs —10— between the main frame —1— and rail —3— at such points as are subjected to most common use as, for example, at suitable intervals along the sides of the frame —1— and rail —3—.

As illustrated, the lower and upper ends of the supplemental springs —10— are secured respectively to lower and upper clip plates —11— and —12—, the clip plates —11— being secured by rivets —13— or equivalent fastening means to the upper faces of the side bars —5— substantially midway between adjacent cross bars —6— so as to extend inwardly beyond the inner faces of the side bars —5—, the inner ends of said clip plates —11— being provided with integral loops —14— which are interlocked with the lower convolutions of the springs —10— in a manner shown in Figures 10 and 11.

Each of the upper clip plates —12— is provided with an eye —15— looped around the adjacent portion of the rail —3— and extends inwardly therefrom over the upper end of the corresponding spring —10— the upper convolution of said spring being secured by a loop —14'— which is formed integral with the clip thereby firmly holding the upper end of the spring —10— in fixed relation to the adjacent portion of the rail —3— while the lower ends of the same springs are held by the loops —14— in fixed relation to the frame bar —1—.

The intermediate deck or floating frame

—4— is supported by the intermediate portions of the springs —2— in a plane between and parallel with the main supporting frame —1— and marginal rail —3— and comprises a series of parallel lengthwise bars —16— and parallel cross bars —17— riveted or otherwise secured to the lengthwise bars —16— at the crossings to form a unitary structure in which the bars are preferably made of relatively thin flat strips of resilient metal capable of yielding under pressure at different points thereof.

The lengthwise bars —16— are alined with the several lengthwise rows of springs —2— and extend between intermediate convolutions of said springs so as to form seats therefor and thereby to divide each spring into two resilient parts capable of yielding independently of each other, the portions of the bars —16— in alinement with the axes of the several springs being pressed up to form bosses —18— for holding the adjacent portions of the springs against lateral movement relatively to said bars and also aiding in holding the springs in spaced relation to prevent friction one with the other.

The cross bars —17— extend transversely of the bars —16— between certain transverse rows of the springs —2— except the end bars which are brought in a little closer to the centers of the end springs and slightly within the vertical planes of the ends of the marginal rail —3— so that these portions of the rail may be brought close to the head and foot boards of the bedstead.

In spring mattresses of this character the longitudinal edges of the upper portions of the system of springs are subjected to more severe strains than other portions thereof tending to flatten the outer longitudinal side rows of the springs and to otherwise deform the mattress as a whole and in order to reduce this tendency to a minimum the upper end of the springs —2— and —10— and also the sides of the rail —3— are connected by braces —19— to the intermediate portions of the frame as —4—.

These braces are preferably made of resilient sheet metal and are arranged directly over the opposite ends of the cross bars —17— so as to extend downwardly and inwardly from the clips —12— over the outermost lengthwise bars —16— to the next adjacent lengthwise bars to which their inner ends are riveted or otherwise secured as shown in Fig. 2.

For convenience and economy of manufacture the braces —19— are preferably formed integral with their respective clips —12— by which they are connected to the upper ends of the supplemental springs —10— and also to opposite sides of the frame —3—.

These brace members —19— serve the double purpose of resisting lateral thrust or deflection of the upper portions of the springs —2— and —10— and rail —3— and of bearing a part of the load upon said springs and rail and also assist in restoring the upper ends of the springs and rail to a normally horizontal plane.

It is now evident that the intermediate floating frame —4— serves to hold the intermediate portions of the coiled springs —2— against relative lateral movement without materially effecting the axial resiliency of the individual springs and that any tendency of one or more springs toward lateral deflection is resisted by all of the springs through their connection with the floating frame and that any tendency toward lateral thrust or deflection of the side springs —2— and —10— and rail —3— is resisted by the braces —19— through their connection with the intermediate frame —4—, all of which assures a free vertical movement of the springs and rail and the restoration of the upper portions of said springs and rail to a horizontal position and the maintenance of the symmetrical form of the mattress even though certain portions thereof may be subjected to more severe usage than other portions.

In some instances, it may be necessary to brace the intermediate portions of the supplemental springs —10— against buckling laterally and for this purpose the braces —19— may be provided with additional brace members —20— projecting outwardly from the intermediate portions thereof between intermediate convolutions of the spring —10— as shown in Figure 3 in which case the portions of the brace members —20— in the axes of the springs —10— may be provided with raised bosses —18— similar to those previously described for holding the intermediate portions of the springs —10— against lateral movement relatively to the braces —19— and floating frame —4—.

In Figure 6 is shown one of the supplemental springs —10— as provided with supplemental clip plates —11— and —12— secured respectively to the lower and upper ends thereof by loops —14— and —14'— integral therewith, said clips being provided with eyes —15— for securement to the rail —3— as previously explained thereby providing a unitary article of manufacture which may be used between the frame —11— and rail —3— or between the supplemental frame —4— and rail as shown in Figure 4.

In Figure 5 is shown a portion of a spring mattress adapted to be mounted upon the slats of wood bedsteads in which case the lower supporting frame —1— is substituted by a marginal wire frame —1'— and if the intermediate floating frame —4— is used portions thereof adjacent the springs —10— may be provided with rigid clips —21— and —21'— engaged with the intermediate portions of the adjacent springs 2 and supplemental springs respectively for holding them against lateral buckling.

In various forms of spring cushions the lower ends of the springs are frequently supported upon sheet metal straps and in Figures, 7. 8 and 9 is shown a special means for holding the springs against lateral movement and for this purpose the supporting strap as —22— is provided with transversely curved grooves —23— and integral loops —24— pressed upwardly from the grooves to form openings through which the lower convolutions of the springs as —2— is threaded by turning the spring about its axis, the grooves —26— being concentric with said axis.

In Figures 10, 11 and 12 is shown another means for holding the coiled spring against relative lateral movement on its supporting band as —22—, said means consisting in pressing up portions of the band in opposite directions to form loops —25— and —26— thru which a straight end 27 of the spring —2— may be inserted.

What I claim is:—

1. In a spring cushion of the character described, a lower deck, a series of coiled springs mounted on the lower deck in parallel lengthwise rows and also in parallel transverse rows, a floating deck mounted upon the intermediate portions of said springs, braces extending upwardly and outwardly from the intermediate portion of the deck between some of the adjacent transverse rows of the springs, and supplemental springs interposed between the upper ends of said braces and the lower deck.

2. In a spring cushion of the character described, a lower deck, a series of coiled springs mounted on the lower deck in parallel lengthwise rows and also in parallel transverse rows, a floating deck mounted upon the intermediate portions of said springs, braces extending upwardly and outwardly from the intermediate portion of the deck between some of the adjacent transverse rows of the springs, supplemental springs interposed between the upper ends of said braces and the lower deck, and a marginal rail extending around the outside of the upper ends of both sets of springs and operatively connected to said braces.

3. In a spring cushion of the character described, a lower deck, a series of coiled springs mounted on the lower deck in parallel lengthwise rows and also in parallel transverse rows, a floating deck mounted upon the intermediate portions of said springs, braces extending upwardly and outwardly from the intermediate portion of the deck between some of the adjacent transverse rows of the springs, supplemental springs interposed between the upper ends of said braces and the lower deck, a marginal rail extending around the outside of the upper ends of both sets of springs and operatively connected to said braces, and additional brace members secured to the first named braces and operatively connected to the intermediate portions of the adjacent supplemental springs.

In witness whereof I have hereunto set my hand this 30th day of March, 1926.

WILLIAM LEWIS.